United States Patent
Kitsukawa et al.

(10) Patent No.: US 9,790,850 B2
(45) Date of Patent: Oct. 17, 2017

(54) TURBOCHARGER SYSTEM

(75) Inventors: Isao Kitsukawa, Fujisawa (JP); Tomohiro Sugano, Fujisawa (JP); Yoshiyuki Abe, Fujisawa (JP); Haruyo Kimura, Fujisawa (JP); Akira Iijima, Fujisawa (JP); Naoki Ishibashi, Fujisawa (JP); Syougo Sakashita, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 399 days.

(21) Appl. No.: 13/881,319

(22) PCT Filed: Oct. 24, 2011

(86) PCT No.: PCT/JP2011/074413
§ 371 (c)(1),
(2), (4) Date: Apr. 24, 2013

(87) PCT Pub. No.: WO2012/057067
PCT Pub. Date: May 3, 2012

(65) Prior Publication Data
US 2013/0213037 A1    Aug. 22, 2013

(30) Foreign Application Priority Data

Oct. 28, 2010 (JP) ................................ 2010-242532

(51) Int. Cl.
*F02B 33/44* (2006.01)
*F02B 37/11* (2006.01)
(Continued)

(52) U.S. Cl.
CPC .............. *F02B 37/11* (2013.01); *F02B 37/10* (2013.01); *F02B 39/10* (2013.01); *F02D 23/00* (2013.01); *Y02T 10/144* (2013.01)

(58) Field of Classification Search
CPC ........ F02B 37/005; F02B 37/14; F02B 37/10; F02B 37/11; F02B 39/10; Y02T 10/144;
(Continued)

(56) References Cited

U.S. PATENT DOCUMENTS 6,782,877 B2 *    8/2004  Nau ........................ F02B 37/12
                                              123/559.3
2006/0196183 A1 *  9/2006 Isogai ............................ 60/607
(Continued)

FOREIGN PATENT DOCUMENTS

JP           2819784         8/1998
JP         2000-248950       9/2000
(Continued)

OTHER PUBLICATIONS

Patent Abstracts of Japan, Publication No. 2006-177171, Published Jul. 6, 2006.
(Continued)

*Primary Examiner* — Jesse Bogue
(74) *Attorney, Agent, or Firm* — Staas & Halsey LLP

(57) ABSTRACT

A turbocharger system for simultaneously improving a fuel efficiency and obtaining a satisfactory hill start performance due to a downsized engine. The system includes an electric assist turbocharger which includes a turbine disposed in an exhaust passage of an engine and driven by exhaust gas, a compressor disposed in an intake passage and driven by a rotational torque of the turbine, and an electric motor assisting a driving force of the compressor and an electric motor control unit which drives the electric motor when detecting a start operation at a sloping road.

6 Claims, 2 Drawing Sheets

(51) Int. Cl.
*F02B 37/10* (2006.01)
*F02B 39/10* (2006.01)
*F02D 23/00* (2006.01)

(58) Field of Classification Search
CPC ..... Y02T 10/42; F02D 23/00; F02D 41/0002; F02D 41/0007
USPC ............ 60/608, 607, 600; 477/167; 701/102
See application file for complete search history.

(56) References Cited

U.S. PATENT DOCUMENTS

2009/0222188 A1* 9/2009 Igarashi ........................ 701/102
2010/0331143 A1* 12/2010 Jager et al. ................... 477/167

FOREIGN PATENT DOCUMENTS

| JP | 2006-63873 | 3/2006 |
|---|---|---|
| JP | 2006-177171 | 7/2006 |
| JP | 2010-209735 | 9/2010 |

OTHER PUBLICATIONS

Patent Abstracts of Japan, Publication No. 2010-209735, Published Sep. 24, 2010.
Patent Abstracts of Japan, Publication No. 2006-063873, Published Mar. 9, 2006.
Patent Abstracts of Japan, Publication No. 2000-248950, Published Sep. 12, 2000.
Patent Abstracts of Japan, Publication No. 04-043821, Published Feb. 13, 1992 (Corresponds to AG).
Seiichi Ibaraki et al., "Development of the "hybrid turbo," an electrically assisted turbocharger", Mitsubishi Heavy Industries, Ltd. Technical Review, vol. 43 No. 3, Sep. 2006, pp. 36-40.
International Search Report of PCT/JP2011/074413 dated Nov. 22, 2011.
Written Opinion of the International Searching Authority dated Nov. 22, 2011 in corresponding International Application No. PCT/JP2011/074413.

* cited by examiner

# TURBOCHARGER SYSTEM

CROSS-REFERENCE TO RELATED APPLICATIONS

This application claims the foreign priority benefit of Japanese Application No. 2010-242532 filed Oct. 28, 2010, the contents of which are incorporated herein by reference, which serves as priority for PCT Application No. JP2011/074413 filed Oct. 24, 2011.

TECHNICAL FIELD

The present invention relates to a turbocharger system capable of realizing a satisfactory hill start performance even when downsizing an engine.

BACKGROUND ART

In recent years, a technique has been actively developed which decreases an engine displacement (downsizes an engine) and ensures a power performance of a supercharger such as a turbocharger in order to improve a fuel efficiency of a vehicle and reduce a carbon dioxide discharge amount.

Since the turbocharger used when downsizing an engine is driven by exhaust energy and a rotation body of the turbocharger has an inertia, it is characterized in that it is difficult to obtain a supercharging pressure (boost pressure) in a transient driving state with respect to a normal driving state.

As illustrated in FIG. 3, even when the engine displacement is decreased by downsizing the engine, it is possible to improve the engine torque and realize the power performance equal to the large-displacement engine by equipping with the turbocharger. However, torque-up may not be expected in an operation area when starting at the sloping road, that is, an area (an area surrounded by the dashed line in FIG. 3) with a high load and a low engine speed (engine rpm). This is caused by the following reasons. When starting the vehicle, the engine speed is extremely low, the exhaust energy (exhaust gas flow rate) is small, and the power for rotating the compressor may not be obtained. Again, since the rotation body of the turbocharger does not have inertia at the same transient condition like the starting operation, the turbocharger may not be easily driven and the supercharging operation may not be substantially performed. Accordingly, there are many limitations in the hill start performance of the vehicle when downsizing the engine.

Furthermore, the information on the related art according to the invention of the application is disclosed in Patent Documents 1 and 2 and Non-Patent Document 1.

PRIOR ART DOCUMENTS

Patent Document 1: JP 2006-177171 A
Patent Document 2: JP 2010-209735 A
Non-Patent Document 1: Ibaraki Seiichi with four others, "Development of hybrid turbo of electric assist turbocharger", Mitsubishi Heavy Industries Technical Review, Vol. 43, No. 3, 2006, p. 36 to 40

As described above, since the turbocharger may not easily exhibit the supercharging performance at a condition in which the engine speed is low or is in a transient state, the engine downsizing limitation is determined by the hill start performance in many cases.

In order to ensure the hill start performance when downsizing the engine, there is a need to add a mechanical supercharger or a hybrid technique, and hence an increase in cost or system size occurs.

SUMMARY OF THE INVENTION

Therefore, the present invention is made to solve the above-described problems, and it is an object of the invention to provide a turbocharger system capable of realizing a satisfactory hill start performance and improving a fuel efficiency due to a downsized engine.

The present invention has been made in order to achieve the above object and provides a turbocharger system including: an electric assist turbocharger which includes a turbine disposed in an exhaust passage of an engine and driven by an exhaust gas, a compressor disposed in an intake passage and driven by a rotational torque of the turbine, and an electric motor assisting a driving force of the compressor; and an electric motor control unit which drives the electric motor when detecting a start operation at a sloping road.

The electric motor control unit may be configured to drive the electric motor at a rotation speed in response to a slope of a road where a vehicle starts to move.

The electric motor control unit may be configured to drive the electric motor in advance at a start time when the slope of the road where the vehicle starts to move is larger than a predetermined threshold value.

The electric motor control unit may be configured to correct the rotation speed in response to the slope of the road where the vehicle starts to move by an atmospheric pressure and to drive the electric motor at the corrected rotation speed.

The electric motor control unit may be configured to correct the rotation speed in response to the slope of the road where the vehicle starts to move by an intake temperature and to drive the electric motor at the corrected rotation speed.

According to the invention, it is possible to provide a turbocharger system capable of simultaneously improving a fuel efficiency and obtaining a satisfactory hill start performance due to a downsized engine.

DETAILED DESCRIPTION

Hereinafter, an embodiment of the present invention will be described by referring to the accompanying drawings.

Figure 1:
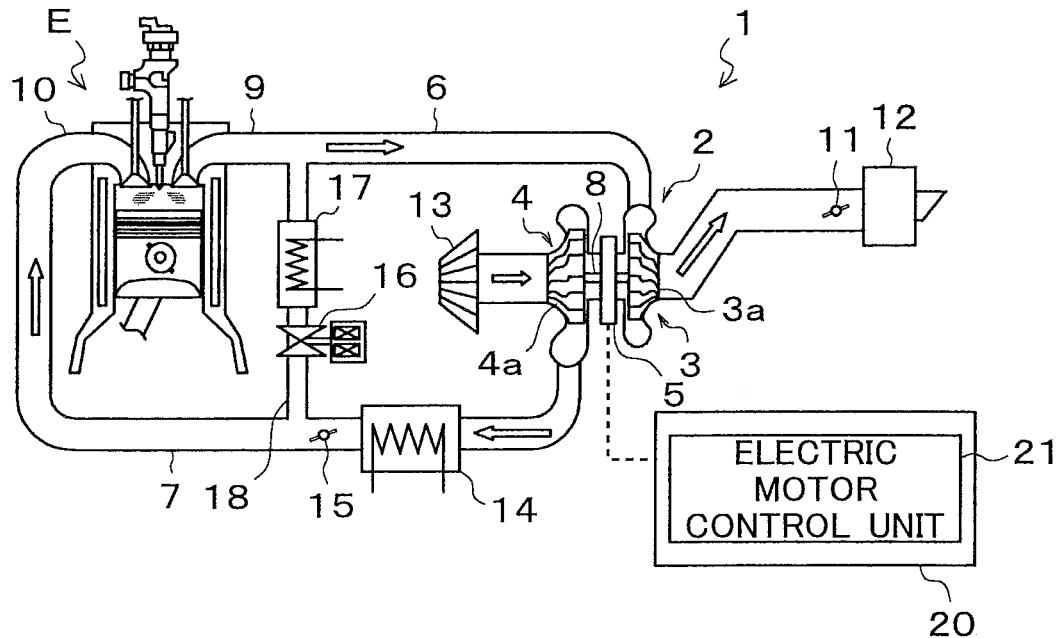
FIG. 1 is a schematic configuration diagram of an engine system that uses a turbocharger system according to an embodiment of the invention.

FIG. 1 is a schematic configuration diagram of an engine system that uses a turbocharger system according to an embodiment.

As illustrated in FIG. 1, a turbocharger system 1 includes an electric assist turbocharger (hybrid turbo) 2 with a turbine 3 which is disposed in an exhaust passage 6 of an engine E as a diesel engine and is driven by an exhaust gas, a compressor 4 which is disposed in an intake passage 7 and is driven by the rotational torque of the turbine 3, and an electric motor 5 which assists the driving force of the compressor 4 (assists the rotational torque of the turbine 3).

The electric motor 5 of the electric assist turbocharger 2 is integrally provided in a turbo shaft 8 which connects the turbine 3 to the compressor 4, that is, a turbine wheel 3a of the turbine 3 and a compressor wheel 4a of the compressor 4. The electric motor 5 is configured as, for example, a DC servo-motor. Furthermore, since the electric motor 5 is integrally provided in the turbo shaft 8, the rotation speed of the electric motor 5 is equal to the rotation speed (turbo rotation speed) of the electric assist turbocharger 2. Hereinafter, the electric assist turbocharger 2 is simply referred to as the turbocharger 2.

The most upstream side of the exhaust passage 6 is connected to an exhaust manifold 9 of the engine E, a downstream side of the exhaust passage 6 is sequentially provided with the turbine 3 of the turbocharger 2, an exhaust throttle 11, and an exhaust gas purification device 12, and the most downstream side of the exhaust passage 6 is opened to the atmosphere.

The most upstream side of the intake passage 7 is provided with an air filter 13, a downstream side of the intake passage 7 is sequentially provided with the compressor 4 of the turbocharger 2, an intercooler (charge air cooler) 14, and an intake throttle 15, and the most downstream side of the intake passage 7 is connected to an intake manifold 10 of the engine E.

Further, in the engine system, exhaust gas recirculation ("EGR") control is performed so that a part of the exhaust gas discharged from the engine E flows back to the intake side. Specifically, an EGR pipe 18 is provided so as to connect the upstream exhaust passage 6 of the turbine 3 to the downstream intake passage 7 of the intake throttle 15, and the EGR pipe 18 is provided with an EGR valve 16 which adjusts the EGR amount (or the EGR ratio) as the amount of the exhaust flowing back to the intake side and an EGR cooler 17 which cools the exhaust gas flowing back to the intake side.

The turbocharger system 1 includes an electric motor control unit 21 which drives the electric motor 5 when detecting a start operation at a sloping road. The electric motor control unit 21 determines the state of the road where the vehicle starts to move and rotates the electric motor 5 in advance only at the so-called hill start time. The electric motor control unit 21 is provided as a program which is stored in an ECU (Electronic Control Unit) 20. Furthermore, the ECU 20 is configured to recognize all engine parameters such as an engine speed, a fuel injection amount, an accelerator opening degree, an atmospheric pressure (external air pressure), and an intake temperature (atmospheric temperature) so as to control the engine E.

The electric motor control unit 21 is configured to drive the electric motor 5 in advance at the start time when all the following hill start assist conditions (1) and (2) are satisfied.

(1) A door of a vehicle is closed in a stopped state.

(2) A slope (a slope in the vehicle running direction) of a road where a vehicle starts to move is large.

A state whether the vehicle is in condition (1) may be determined, for example, when a vehicle speed detected by a vehicle speed sensor is 0 (or a predetermined threshold value or less). Further, a state where the door is closed may be determined by a door sensor.

The hill start assist condition (2) may be satisfied when the slope (the slope in the vehicle running direction) of the road where the vehicle is stopped is detected and the magnitude of the slope is larger than the predetermined threshold value.

The method of detecting the slope of the road is not particularly limited. For example, the slope may be detected based on an output of a G-force sensor used otherwise for control of the ABS (Anti-lock Brake System), the slope may be detected from the detection history (the detection histories of the pitch angle, the yaw angle, and the roll angle) of a gyro sensor (angular velocity sensor) mounted on the navigation system, or the slope of the vehicle running direction may be detected from elevation information obtained by detecting the vehicle position and the vehicle running direction by a GPS (Global Positioning System) and acquiring the vehicle position and the peripheral elevation information through the navigation software embedded in the navigation system.

Furthermore, the slope of the road for condition (2) may be indirectly detected if the hill start state may be determined. For example, when the brake boost pressure (or the brake hydraulic pressure) is a threshold value or more, the hill start assist condition (2) may be satisfied. Further, when the parking brake is operated, the hill start assist condition (2) may be satisfied.

The electric motor control unit 21 may start the driving of the electric motor 5 when detecting the driver's starting operation, that is, immediately before the starting operation in a case where the hill start assist condition is satisfied. Furthermore, a case may be considered in which the electric motor 5 is continuously driven in a vehicle stopped state. However, in this case, when the vehicle stop time is long, the power for driving the electric motor 5 is wasted and hence the fuel efficiency is degraded.

The driver's starting operation may be detected by, for example, a gear-in signal and a clutch release signal in a manual transmission vehicle or a brake release signal in an automatic transmission vehicle. The brake release signal may be detected by a brake boost pressure (or a brake hydraulic pressure), a brake switch used to turn on a brake lamp, or a brake sensor used to air-assist an air brake. Furthermore, the driving of the electric motor 5 may be started when operating an accelerator pedal after releasing the brake. However, in this case, the boost pressure during the start operation may not be increased within appropriate time, and the sufficient engine torque may not be obtained.

The electric motor control unit 21 is configured to drive the electric motor 5 at the rotation speed in response to the slope of the road where the vehicle starts to move. Accordingly, the rotation speed of the electric motor 5 increases as the slope increases, and the engine torque generated by increasing the boost pressure may increase.

Further, the electric motor control unit 21 is configured to correct the rotation speed in response to the slope of the road where the vehicle starts to move by the atmospheric pressure (external air pressure) and the intake temperature (atmospheric temperature) and to drive the electric motor 5 at the corrected rotation speed. This is because a pressure difference between the inlet and the outlet of the compressor 4 needs to be large so as to obtain a desired boost pressure in a place, for example, a high elevation where the atmospheric pressure is low. For this reason, the turbo rotation speed needs to be large. Further, since the density of the air changes due to the temperature and the amount of the work of the compressor 4 for obtaining a desired boost pressure changes, a correction using the intake temperature (atmospheric temperature) needs to be also performed.

For such correction (environment correction), a first correction coefficient map (not illustrated) referred for the atmospheric pressure and a second correction coefficient map (not illustrated) referred for the intake temperature are prepared in the ECU 20, and two correction coefficients obtained from both correction coefficient maps are multiplied by the rotation speed in response to the slope of the road where the vehicle starts to move, so that the corrected rotation speed may be obtained. The atmospheric pressure may be detected by an atmospheric pressure sensor (baro sensor), and the intake temperature may be detected by an atmospheric temperature sensor or a temperature sensor provided in the intake passage 7. Furthermore, since the atmospheric pressure is substantially proportional to the elevation, the rotation speed may be corrected by the elevation instead of the atmospheric pressure. In this case, for example, the elevation at the vehicle position obtained by the GPS is detected, the obtained elevation is referred to the correction coefficient map, and the obtained correction coefficient is multiplied by the rotation speed in response to the slope of the road where the vehicle starts to move, thereby obtaining the corrected rotation speed.

Furthermore, the electric motor control unit 21 may stop the driving of the electric motor 5 when any one of the electric assist stop conditions (1) and (2) is satisfied after performing the hill start operation by driving the electric motor 5.

(1) It is a case where the boost pressure is equal to or larger than the target boost pressure set for each of the engine speed and the engine torque.

(2) It is a case where a relation between the engine speed and the engine torque enters an operation area in which the sufficient supercharging operation may be performed even when the electric motor 5 is not driven.

Regarding the electric assist stop condition (1), the target boost pressure map (not illustrated) set for each of the engine speed and the engine torque is prepared in the ECU 20, and the driving of the electric motor 5 may be stopped when the actually measured boost pressure (the pressure of the intake manifold 10) is equal to or larger than the target boost pressure obtained by referring to the target boost pressure map. Furthermore, the engine torque may be obtained from the engine parameter such as a fuel injection amount.

Figure 2:
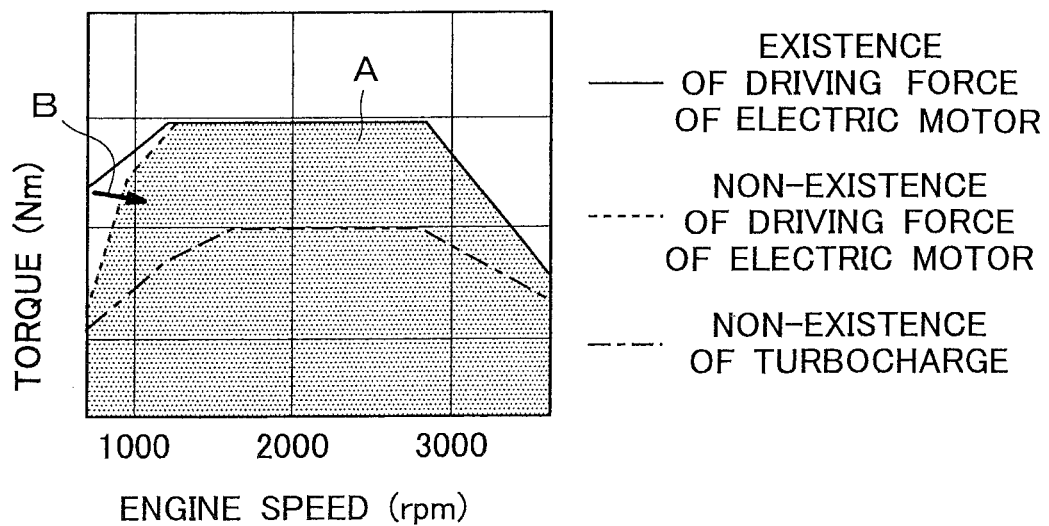
FIG. 2 is a diagram illustrating a relation of an engine torque with respect to an engine speed in a case where an electric turbocharger is driven or not driven in the turbocharger system of FIG. 1.
Figure 3:
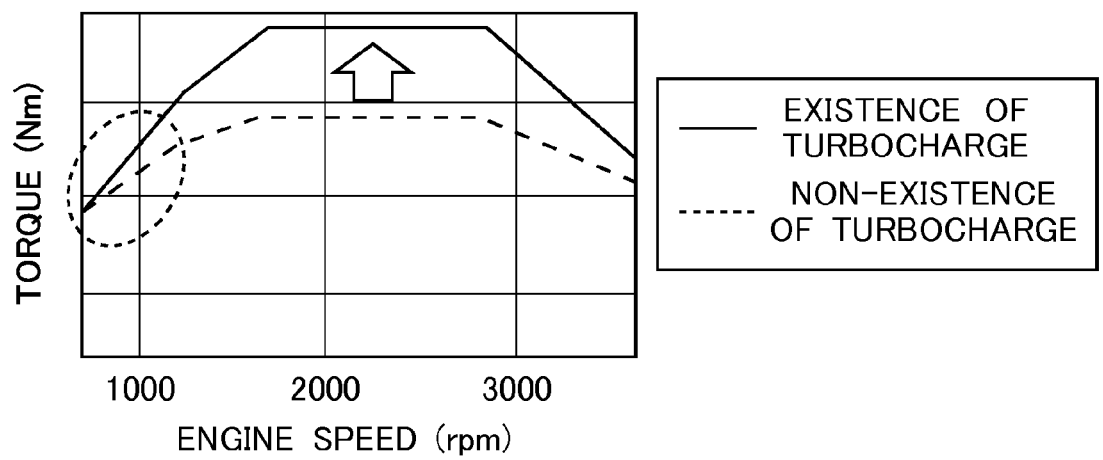
FIG. 3 is a diagram illustrating a relation of an engine torque with respect to an engine speed in a turbocharger system of the related art.

The electric assist stop condition (2) will be described by referring to FIG. 2. FIG. 2 is a graph illustrating an entire load characteristic in each of the case where the electric motor 5 is driven (the sold line) or the electric motor 5 is not driven (the dashed line) in the turbocharger system 1 of the invention. Furthermore, in FIG. 2, the case without the turbocharger is indicated by the one-dotted chain line for the reference.

As illustrated in FIG. 2, in the turbocharger system 1, it is possible to improve the torque in an area where the engine speed is extremely low by driving the electric motor 5. Here, the operation area A indicated by the hatching in FIG. 2, that is, the operation area A surrounded by the characteristic (the dashed line) of the entire load characteristic in a case where the electric motor 5 is not driven is an operation area where the sufficient supercharging operation may be performed even when the electric motor 5 is not driven. Accordingly, the driving of the electric motor 5 may be stopped when the relation between the engine speed and the engine torque enters the operation area A as indicated by the arrow B.

Further, the electric motor control unit 21 is configured to forcedly stop the driving of the electric motor 5 when the power consumption of the electric motor 5 is a predetermined threshold value or more or the rotation speed of the electric motor 5 is a predetermined threshold value or more.

The reason why the driving of the electric motor 5 is forcedly stopped when the power consumption of the electric motor 5 is a predetermined threshold value or more is because a dead battery may be prevented by suppressing the excessive power consumption of the battery.

The reason why the driving of the electric motor 5 is forcedly stopped when the rotation speed of the electric motor 5 is a predetermined threshold value or more is because the electric motor 5 may be protected by preventing the overrun of the electric motor 5.

As described above, the turbocharger system 1 includes the electric assist turbocharger 2 which includes the electric motor 5 for assisting the driving force of the compressor 4, and drives the electric motor 5 when detecting the start operation at the sloping road.

Accordingly, it is possible to sufficiently feed the air to the engine E even at the hill start operation with small exhaust energy and to obtain the large engine torque at the start operation by increasing the boost pressure. That is, according to the invention, the satisfactory hill start performance may be realized.

In the related art, when the idling rotation speed is set to be low, the hill start performance is degraded. Further, when the accelerator stepping amount is not set to be large for the hill start operation, the sufficient engine torque may not be obtained. However, according to the invention, since the sufficient boost pressure is obtained in advance at the start time, the sufficient engine torque may be obtained even when the idling rotation speed is set to be low or the accelerator stepping amount at the start time is small. That is, according to the invention, the engine torque at the hill start time may be improved regardless of the idling rotation speed or the accelerator on-off state.

Further, according to the invention, the satisfactory hill start performance may be ensured even when the engine displacement is decreased due to the downsized engine. Accordingly, it is possible to further downsize the engine and hence to further improve the fuel efficiency.

Furthermore, in the invention, the system size and the cost may be decreased compared to the related art in which the mechanical supercharger is added or the hybrid technique is added.

Further, since the turbocharger system 1 corrects the rotation speed in response to the slope of the road where the vehicle starts to move by the atmospheric pressure and the intake temperature and drives the electric motor 5 by the corrected rotation speed, it is possible to obtain the sufficient engine torque at the hill start time regardless of the elevation or the atmospheric temperature of the running place.

Further, in the electric assist turbocharger 2, the regenerative power may be obtained by using the electric motor 5 as the power generator when the exhaust energy is enough.

The invention is not limited to the above-described embodiment, and various modifications may be, of course, made in the scope without departing from the spirit of the invention.

For example, in the above-described embodiment, a case has been described in which the engine E is a diesel engine, but the invention may be applied to a gasoline engine or the like instead of the diesel engine.

The invention claimed is:

1. A turbocharger system for a vehicle, comprising:
   an electric assist turbocharger which includes a turbine disposed in an exhaust passage of an engine and driven by an exhaust gas, a compressor disposed in an intake passage and driven by a rotational torque of the turbine, and an electric motor assisting a driving force of the compressor; and an electric motor controller configured to drive the electric motor when detecting that both the vehicle is stopped at a slope and a vehicle start operation by a driver of the vehicle, wherein the vehicle is detected as being stopped at the slope when both a magnitude of the slope in a vehicle moving direction, from where the vehicle is stopped, is larger than a predetermined value and a parking brake of the vehicle is engaged, and wherein the vehicle start operation is detected when the driver puts the vehicle in gear or the parking brake is changed from the engaged to disengaged state.

2. The system according to claim 1, wherein the electric motor controller is configured to command the electric motor to stop when a relation between a rotation speed of the engine and an engine torque enters an operation area surrounded by a characteristic of an entire load torque where the electric motor is not driven.

3. The system according to claim 1, wherein the electric motor controller is configured to correct a rotation speed of the electric motor in response to the magnitude of the slope, the correction calculated from a detected atmospheric pressure that is detected, and to drive the electric motor at the corrected rotation speed of the electric motor.

4. The system according to claim 1, wherein the electric motor controller is configured to correct a rotation speed of the electric motor in response to the magnitude of the slope, the correction calculated from a detected temperature of air at the intake passage, and to drive the electric motor at the corrected rotation speed of the electric motor.

5. The system according to claim 1, wherein the vehicle being stopped is further detected by a vehicle speed sensor.

6. The system according to claim 1, wherein the magnitude of the slope is detected using at least one of an output of a G-force sensor, a gyro sensor, or a global positioning system of the vehicle.

* * * * *